United States Patent
Janssen et al.

(10) Patent No.: US 6,693,694 B2
(45) Date of Patent: *Feb. 17, 2004

(54) ELECTRO-OPTIC DISPLAY DEVICE WITH REDUCED ELECTRICAL ASYMMETRY

(75) Inventors: Peter J. Janssen, Scarborough, NY (US); George A. Melnik, Montrose, NY (US); Sergei Yevgenyevich Yakovenko, Minsk (BY); Victor Alexeevich Konovalov, Minsk (BY); Anatoli Alexeevich Muravski, Minsk (BY)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 397 days.

(21) Appl. No.: 09/313,547

(22) Filed: May 14, 1999

(65) Prior Publication Data

US 2001/0003474 A1 Jun. 14, 2001

(51) Int. Cl.⁷ .............................................. G02F 1/1333
(52) U.S. Cl. ........................................ 349/122; 349/123
(58) Field of Search .................................. 349/122, 123

(56) References Cited

U.S. PATENT DOCUMENTS

| | | | | |
|---|---|---|---|---|
| 4,488,786 A | * | 12/1984 | Caramel | 350/337 |
| 4,729,638 A | | 3/1988 | Shirai | 350/339 |
| 4,779,957 A | * | 10/1988 | Suginoya et al. | 350/339 R |
| 5,042,920 A | * | 8/1991 | Yoshino et al. | 359/68 |
| 5,071,228 A | * | 12/1991 | Waldmann et al. | 359/63 |
| 5,076,671 A | * | 12/1991 | Uchimi et al. | 359/56 |
| 5,237,439 A | * | 8/1993 | Misono et al. | 359/74 |
| 5,325,219 A | | 6/1994 | Hanyu et al. | 359/78 |
| 5,488,497 A | * | 1/1996 | Takanashi et al. | 359/74 |
| 5,568,287 A | * | 10/1996 | Shingaki et al. | 359/53 |
| 5,644,415 A | * | 7/1997 | Aoki et al. | 349/122 |
| 5,663,778 A | * | 9/1997 | Konno et al. | 349/122 |
| 5,717,475 A | * | 2/1998 | Kamio et al. | 349/147 |
| 5,808,715 A | * | 9/1998 | Tsai et al. | 349/122 |
| 5,877,836 A | * | 3/1999 | Miura et al. | 349/184 |
| 5,953,091 A | * | 9/1999 | Jones et al. | 349/129 |
| 6,072,629 A | * | 6/2000 | Fan et al. | 359/497 |

FOREIGN PATENT DOCUMENTS

| | | | | |
|---|---|---|---|---|
| JP | 62-251720 A | * | 11/1987 | |
| JP | 05346585 A | | 12/1993 | G02F/1/1337 |
| JP | 08184824 A | | 7/1996 | G02F/1/1335 |

* cited by examiner

Primary Examiner—Tarifur R. Chowdhury

(57) ABSTRACT

The electrical asymmetry in certain electro-optic display device structures employing orientation layers, evidenced as an internal DC voltage, is reduced or eliminated by inserting a barrier layer between the orienting layers and adjacent electrode layers, thereby reducing or eliminating a DC offset which leads to flicker in a display image when such devices are driven with an AC waveform.

12 Claims, 2 Drawing Sheets

ELECTRO-OPTIC DISPLAY DEVICE WITH REDUCED ELECTRICAL ASYMMETRY

BACKGROUND OF THE INVENTION

This invention relates to display devices for use in display systems for displaying image employing electro-optic light modulators.

Display systems employing electro-optic light modulating display devices are particularly suitable for displaying color information in the form of continuously updated image information signals arranged in successive frames representing full color frames, such as color video information, in which each frame is composed of component color sub-frames.

These systems employ one or more electro-optic light modulating display devices comprised of a row-and-column matrix array of pixels, for modulating light in accordance with the image information signals during successive frame periods. The signal information is applied to the pixel rows of the array a line at a time during each frame period.

Such display systems typically employ three such display devices, one for each of the primary color components of the color display signal. A scrolling color projection display system is also known in which color bars are repetitively scrolled across a single electro-optic light modulator device to produce a color display. See, for example, commonly assigned U.S. Pat. No. 5,532,763, incorporated herein by reference.

Active-matrix liquid crystal display (AMLCD) devices on silicon, are being considered for use as electro-optic light modulators for color displays. Such devices operating in the reflective mode are particularly suitable for high resolution displays, due to the fact that the matrix structure of row and column electrodes, switches and storage capacitors can all be integrated on the silicon substrate below the reflective pixel electrodes, thus enabling the high pixel density required for such high resolution displays.

In a typical construction, an array of electrodes of a reflective metal such as aluminum are deposited on the silicon substrate. These electrodes define the individual pixels of the array. Next, an orienting layer is formed on the array of reflective pixel electrodes. This layer is formed of a material capable of orienting the molecules of a liquid crystal material in a preferred direction, such as a polyimide, after which the layer is rubbed to produce a direction of orientation corresponding to the rubbing direction. An opposing transparent substrate, typically of glass, carries an opposing, transparent electrode, typically of indium-tin oxide (ITO), and a second orienting layer, which may also be a rubbed polyimide. These opposing structures define a cell within which the liquid crystal material is contained.

In order to avoid degradation of the liquid crystal material, and to maintain a symmetric electrical behavior of the LCD during driving, such LCDs are driven with AC signals. That is, the polarity of successive information signals for each pixel alternates between positive and negative.

Unfortunately, the asymmetrical physical structure of the reflective LCD device leads to a large electrical asymmetry during driving, which manifests itself in the form of a DC offset superimposed on the AC drive voltage in the LC. This DC off-set produces noticeable flicker in a continuously updated display image, such as a video image, particularly when the array is driven by the frame inversion method, in which all of the pixels of the array are driven to the same polarity in one frame, and then to the opposite polarity in the next frame.

The use of other drive inversion schemes, such as row, column or pixel inversion, can reduce the perceived flicker in the display image. In row and column inversion, alternate rows or columns are driven to opposite polarities in each frame, while in pixel inversion, some other pattern of inversion is employed on the pixel level, such as a checkerboard pattern. However, none of these methods will eliminate flicker unless the electrical asymmetry is very small. In addition, these driving schemes may cause artifacts such as contrast loss or the appearance of vertical or horizontal stripes in moving objects.

Another way to suppress flicker is to adjust the drive voltage to compensate for the DC off-set. However, such an active compensation scheme is difficult to implement, since the off-set voltage tends to be non-uniform over the pixel array, and also tends to vary with time.

Another way to suppress flicker is to drive the display device at a higher frame rate, as is commonly done in the case of CRTs used in computer monitors. However, driving at a higher frame rate increases the cost and complexity of the driving circuitry. Moreover, driving a color sequential system at a higher frame rate requires either a faster switching LC or else reduces brightness of the display due to the increased overhead needed to compensate for the LC response.

In U.S. Pat. No. 5,764,324, a flicker-free reflective LCD cell is said to be provided in which the work function of the reflective electrode is made approximately equal to that of the transparent electrode by covering the reflective layer with a layer of the transparent electrode material. In addition, a layer of a dielectric material may be disposed between the reflective layer and the transparent layer of the reflective electrode.

In Japanese patent abstract 08184824, a flicker-free reflective LCD cell is said to be provided by forming an insulating film on the liquid crystal side of the transparent electrode. The insulating film is said to act similarly to the reflective electrode, thus providing electrical symmetry between both electrodes.

In Japanese patent abstract 63-77016, a flicker-free LCD cell is said to be provided by equalizing the electric resistance of the orientation layers.

OBJECTS AND SUMMARY OF THE INVENTION

It is an object of the invention to reduce or substantially eliminate the DC offset which occurs in electro-optic light modulator devices during AC driving, without adding additional electrically conducting layers, altering the orientation layers, or changing the drive conditions.

In accordance with the invention, it has been discovered that the DC offset which is present during AC driving of an electro-optic display device is due to an electro-chemical interaction between the electrodes and the liquid crystal orientation layers which are in contact with the electrodes. In any such display device in which there are differences in electro-chemical interaction on opposite sides of the LC cell, leading to an internal DC voltage, a DC offset is likely to occur, with greater differences leading to greater offsets.

Such differences are likely to be greatest in reflective display devices having a reflective electrode on one side of the LC cell, and a transmissive electrode on the other side. As used herein, the term "reflective" is meant to include partially reflecting, semitransparent electrodes, such as are used in transflective display devices.

In accordance with the invention, the DC offset occurring during AC driving of an electro-optic display device caused by an internal DC voltage in the display cell is reduced or substantially eliminated by forming intermediate barrier layers (eg., electrically insulating layers) between the liquid crystal orienting layers and adjacent layers (eg., electrode layers), to prevent the electro-chemical interaction which would otherwise occur between these layers.

In accordance with the invention, there is provided an electro-optic display device comprising an electro-optic material between two supporting substrates, each of the supporting substrates having an orienting layer in contact with the electro-optic material, and at least one layer of another material which is electro-chemically interactive with the orienting layer, wherein the improvement comprises barrier layers formed between the orientation layers and the electro-chemically interactive layers.

The electro-chemically interactive layers are typically of electrically conducting material, while the barrier layers are typically of electrically insulating material, either organic or inorganic, but preferably chosen from the inorganic oxides or nitrides, such as the silicon nitrides and oxides, tantalum oxides and titanium oxides.

In accordance with a preferred embodiment of the invention, the electro-optic display device is a reflective device, in which a first substrate supports an array of reflective electrodes defining an array of pixel elements, and a first orientation layer covering the array of pixel electrodes, and a second transparent substrate supports a common transparent electrode, and a second orientation layer covers the common electrode, wherein a first electrically insulating layer is formed between the array of pixel electrodes and the first orientation layer, and a second electrically insulating layer is formed between the common electrode and the second orientation layer.

DESCRIPTION OF THE PREFERRED EMBODIMENTS

Figure 1:
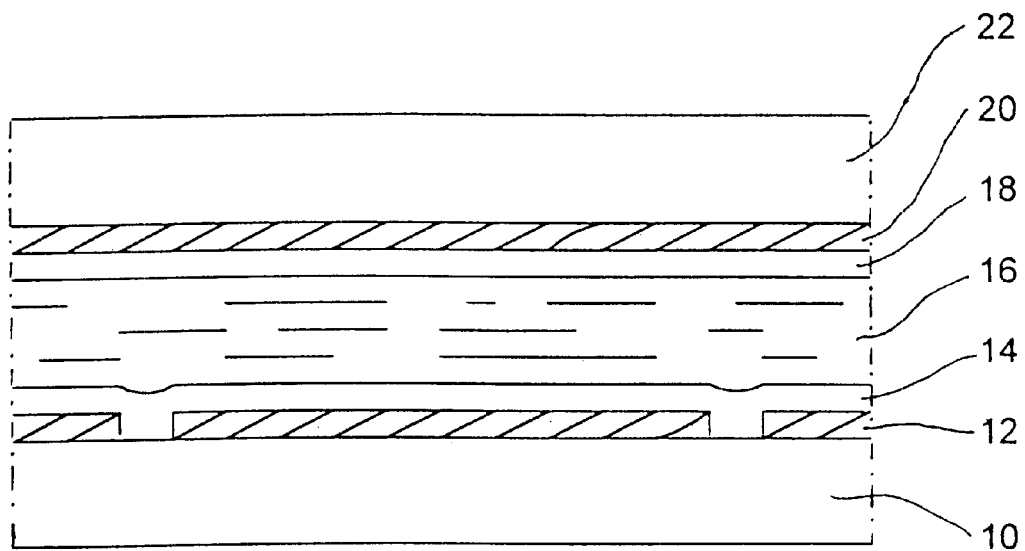
FIG. 1 is a simplified schematic cross-section view of a portion of a typical reflective AMLCD device of the prior art.

Referring to FIG. 1, there is shown schematically a cross-section of a portion of a reflective display device of the prior art, having a substrate 10 of silicon, which may contain lines, switches and storage capacitors, not shown, for an active matrix array. Supported on the surface of the substrate 10 are portions of a reflective electrode array 12 of an electrically conducting material, such as aluminum or an aluminum alloy. This electrode array 12 is divided into an array of separate sub-electrodes or "pixel" electrodes, each defining a separate pixel of the display. Formed on top of electrode layer 12 is an orientation layer 14 of a polyimide, rubbed in a known manner to provide a direction of orientation.

A second substrate 22, of a transparent material such as glass, supports layer 20, which forms a common counter electrode of a transparent electrically conducting material such as indium-tin oxide (ITO). On top of counter electrode 20 is a second orientation layer 18 of rubbed polyimide. Other possible orientation layers include photo-aligned organic layers, or obliquely-evaporated insulating layers.

The substrates 10 and 22, and their supported structures, form a cell within which is confined a liquid crystal material 16, such as a twisted nematic liquid crystal (TN-LC) material. As is known, when the molecules of the TN-LC material assume a preferred orientation induced by contact with orientation layers 14 and 18, the TN-LC material modulates polarized light in accordance with an applied voltage. A polarizing element (not shown) is commonly provided in such an electro-optic device, either in contact with or adjacent to the outside surface of substrate 22, to both polarize the incoming light and analyze the reflected light, in the known manner.

In order to substantially eliminate the electro-chemical interaction and thus the internal DC voltage responsible for the DC offset during AC driving, it is important to provide a barrier layer between each polyimide layer and any adjacent electrically conducting layers which would otherwise come into contact with the polyimide.

Figure 2:
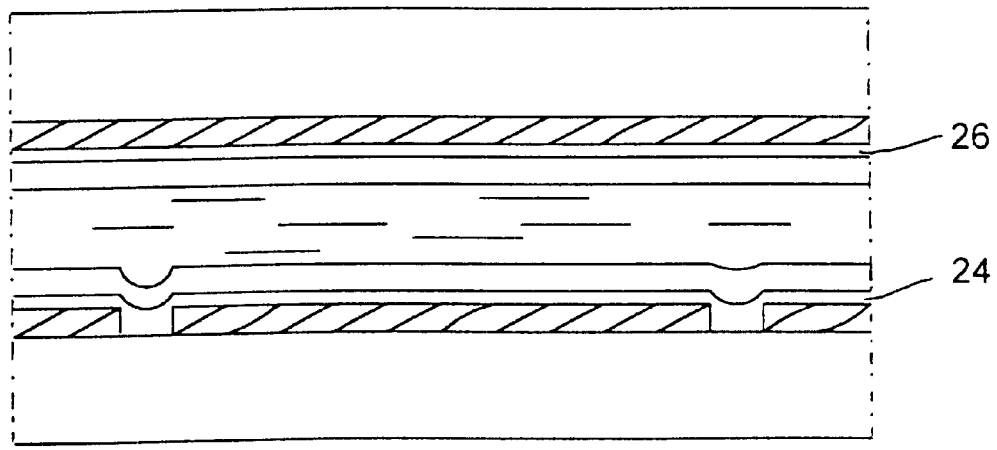
FIG. 2 is a simplified schematic cross-section view of a portion of a typical reflective AMLCD device of the invention.

FIG. 2 shows two such insulating layers in a device similar to that shown in FIG. 1. Insulating layer 24 is formed between electrode array 12' and polyimide layer 14', while insulating layer 26 is formed between counter electrode 20' and polyimide layer 18'. These insulating layers 24 and 26 are formed of silicon nitride, although other suitable insulating materials may be substituted for the silicon nitride, such as an oxide of silicon, or an oxide or nitride of titanium, aluminum or tantalum. Any other insulating material may alternatively be used, so long as it substantially reduces or inhibits electro-chemical interaction between layers 12' and 14' and between layers 18' and 20'.

The thickness of the barrier layers should be sufficient to substantially reduce or eliminate electro-chemical interaction between the orientation layers and the adjacent layers. A layer thickness of 100 nanometers has been found to be sufficient for this purpose, although much thinner layers (as thin as one monolayer) could be used.

A thickness larger than that needed to substantially reduce or eliminate electro-chemical interaction is acceptable, so long as the accompanying increase in voltage drop across the layers and drive voltage amplitude are acceptable. Preferably, the maximum thickness should be much smaller than, eg., 15–20% of, the thickness of the LC layer, which can range from about 0.7 to 6 micrometers for these devices.

Four test cells having a structure similar to those shown in FIGS. 1 and 2 were constructed using standard fabrication techniques. For each test cell, a reflective aluminum electrode having a thickness of about 1000 Angstroms was sputtered onto a single crystal silicon substrate and an indium-tin oxide (ITO) counter electrode having a thickness of about 200–400 Angstroms was deposited on a glass substrate. Polyimide layers were then formed on the aluminum and ITO electrodes by spinning and baking, after which the layers were given an orientation direction by rubbing.

In the first test cell, designated A, a 100 nanometer thick layer of silicon nitride was deposited on the aluminum electrode prior to formation of the polyimide layers. The silicon nitride was deposited by plasma-enhanced chemical vapor deposition (PECVD) at a temperature of around 180–200 C. The substrates were then assembled into a test cell, after which the cell was filled with TN-LC material and sealed.

In the second test cell, designated B, a 100 nanometer thick layer of silicon nitride was deposited on both the aluminum electrode and the ITO electrode by the above technique prior to formation of the polyimide layers. In the third test cell, designated C, a 100 nanometer thick layer of silicon nitride was deposited only on the ITO electrode by the above technique prior to formation of the polyimide layers. In the fourth test cell, designated D, no silicon nitride layer was deposited on either the aluminum or the ITO electrode.

Flicker was measured for each test cell by driving the cells with a balanced AC driving signal and measuring the difference in frame-to-frame brightness of individual pixels. Two sets of measurements were taken, a first set taken one week after assembly and reported in Table I, and a second set taken three months after assembly, and reported in Table II. Flicker is expressed as an average percentage difference in frame-to-frame brightness for up to six different pixels.

Also reported in Tables I and II are calculated values of DC correction values in mV needed to compensate for the average flicker values.

TABLE I

| Cell | Passivated electrodes | Flicker (%) | DC correction (mV) |
|---|---|---|---|
| A | Al | 28 | −132 |
| B | Al and ITO | 0 | 0 |
| C | ITO | 22 | −133 |
| D | None | 25 | −137 |

TABLE II

| Cell | Passivated electrodes | Flicker (%) | DC correction (mV) |
|---|---|---|---|
| A | Al | 17 | −73 |
| B | Al and ITO | 0 | 0 |
| C | ITO | 29 | −166 |
| D | None | 31 | −170 |

As may be seen from the Tables, passivation of both electrodes is necessary to eliminates the flicker. Moreover, passivation of only one electrode has little or no effect, and in some cases actually increases flicker. In the case in which the Al electrode alone is passivated, the flicker of the A cell is noticeably reduced after aging for three months, however, the flicker nevertheless remains at a significant level (17%).

Next, the aluminum and ITO electrodes of the B and D cells were connected to a compensator consisting of a variable DC voltage generator in series with a sensitive ampere meter, and the current flow at zero voltage was measured to determine the presence of an electro-chemical potential in the cells.

Figure 3:
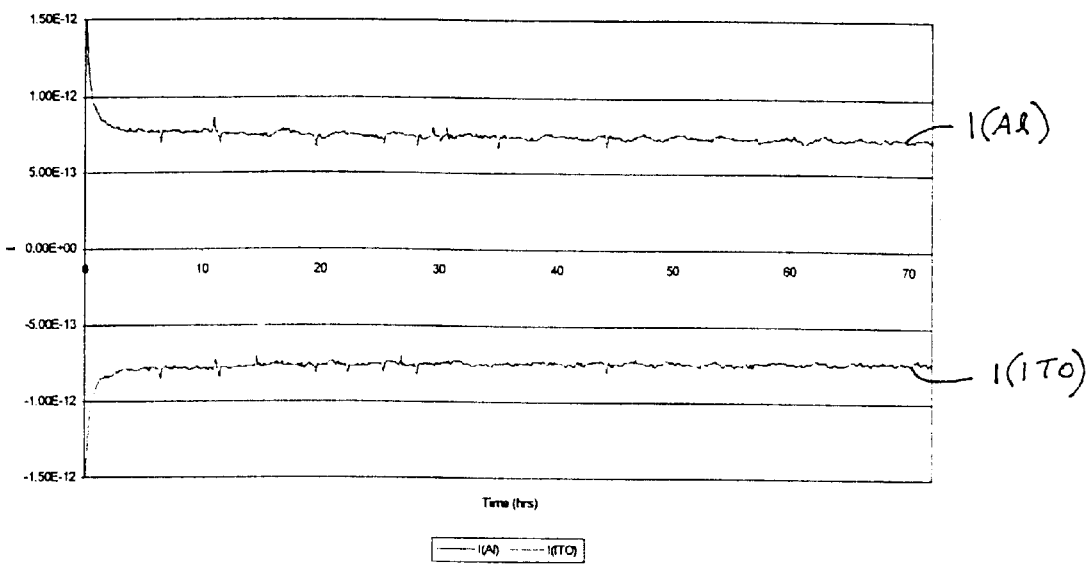
FIG. 3 is a plot of current versus time for a test cell having a structure similar to that shown in FIG. 1.
Figure 4:
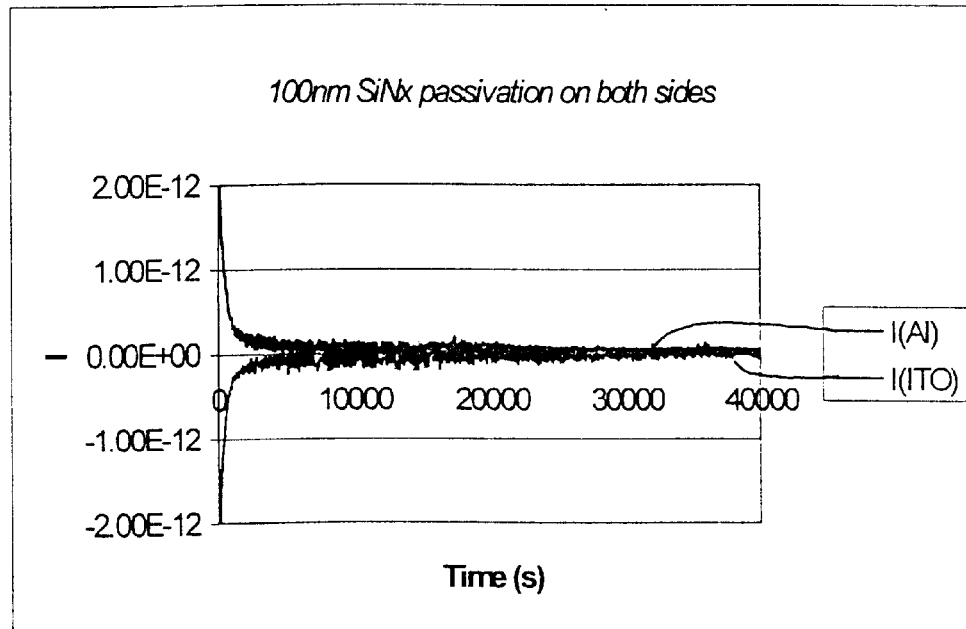
FIG. 4 is a plot similar to that of FIG. 3 for a test cell having present the layers of insulating material as shown in FIG. 2.

Results are shown in FIG. 3, which is a plot of current (amps) versus time (hours) for the D cell without the silicon nitride layers, and FIG. 4, a similar plot (except that time scale is expanded and time is expressed in seconds) for the B cell with silicon nitride.

FIG. 3 shows a large initial current flow which rapidly decays to a sustained positive current flow of about 0.1 picoamps/mm$^2$ from the aluminum electrode to the ITO electrode, indicating electro-chemical activity.

FIG. 4 shows a small initial current flow which rapidly decays to zero, which indicates the normal discharging process for a stack of passive layers.

The current flow in the first test cell without silicon nitride can be shown to correspond to an internal voltage of about 350 mV, which is sufficient to cause noticeable flicker during driving of the cell with an AC waveform in a display device. The addition of the silicon nitride on both electrodes of the second test cell eliminates the current flow and consequently the internal voltage responsible for the flicker.

The invention has been described in terms of a limited number of embodiments. Other embodiments, variations of embodiments and art-recognized equivalents will become apparent to those skilled in the art, and are intended to be encompassed within the scope of the invention, as set forth in the appended claims.

What is claimed is:

1. An electro-optic image display device comprising a layer of an electro-optic material between first and second substrates, the first and second substrates supporting, on a respective side of each respective substrate facing the layer of electro-optic material, in order from the surface of the respective substrate toward the layer of electro-optic material:

first and second electro-chemically interactive layers, respectively, of an electro-chemically interactive material;

first and second barrier layers, respectively, of a relatively non-reactive material; and first and second orienting layers, respectively, of orienting material, the first electro-chemically interactive layer comprising a first layer of electrically conductive material patterned to form an array of reflective electrodes defining an array of pixel elements.

2. The electro-optic display device of claim 1, in which:

the first orientation layer covers the array of pixel electrodes;

the second substrate is substantially transparent;

the second electro-chemically interactive layer is electrically conductive and forms a transparent common counter electrode;

the second orientation layer covers the common counter electrode;

the first barrier layer is formed between the array of pixel electrodes and the first orientation layer; and the second barrier layer is formed between the common counter electrode and the second orientation layer.

3. The electro-optic display device of claim 2, in which at least one of the first and second orientation layers comprises a rubbed polyimide layer.

4. The electro-optic display device of claim 2, in which at least one of the first and second orientation layers comprises a photo-aligned organic layer.

5. The electro-optic display device of claim 2, in which at least one of the first and second orientation layers comprises an obliquely-deposited insulating layer.

6. The electro-optic display device of claim 2, in which the reflective electrodes comprise at least one of aluminum and aluminum alloys.

7. The electro-optic display device of claim 2, in which the common counter electrode comprises indium-tin oxide.

8. The electro-optic display device of claim 2, in which the first and second barrier layers comprise electrically insulating material.

9. The electro-optic display device of claim 1, in which the at least one of the first and second barrier layers comprises an electrically insulating layer.

10. The electro-optic display device of claim 9, in which the electrically insulating layer comprises material selected from the group consisting of the nitrides and oxides of silicon, titanium, aluminum, and tantalum.

11. The electro-optic display device of claim 1, in which the thickness of the first barrier layer is from about one monolayer to about 20 percent of the thickness of the electro-optic material layer.

12. The electro-optic display device of claim 1, in which the reflective electrodes comprise at least one of aluminum and aluminum alloys.

* * * * *